US008645178B2

(12) United States Patent
Nguyen et al.

(10) Patent No.: US 8,645,178 B2
(45) Date of Patent: Feb. 4, 2014

(54) TASK MANAGEMENT FOR A PLURALITY OF TEAM MEMBERS

(75) Inventors: David T. Nguyen, San Jose, CA (US); Jordan K. Buller, Chicago, IL (US); Andrew E. Fano, Lincolnshire, IL (US); Michael E. Bechtel, Naperville, IL (US); Patrick Lai, Mountain View, CA (US)

(73) Assignee: Accenture Global Services Limited, Dublin (IE)

( * ) Notice: Subject to any disclaimer, the term of this patent is extended or adjusted under 35 U.S.C. 154(b) by 186 days.

(21) Appl. No.: 13/096,138

(22) Filed: Apr. 28, 2011

(65) Prior Publication Data

US 2012/0278117 A1 Nov. 1, 2012

(51) Int. Cl.
*G06Q 10/00* (2012.01)

(52) U.S. Cl.
USPC ........ 705/7.15; 705/7.13; 705/7.17; 705/7.23

(58) Field of Classification Search
USPC .............................. 705/7.13, 7.15, 7.17, 7.23
See application file for complete search history.

(56) References Cited

U.S. PATENT DOCUMENTS

| | | | | |
|---|---|---|---|---|
| 5,664,098 | A * | 9/1997 | Bianchi et al. | 726/16 |
| 6,101,481 | A * | 8/2000 | Miller | 705/7.13 |
| 7,082,457 | B1 * | 7/2006 | Burianek et al. | 709/204 |
| 7,139,719 | B1 | 11/2006 | Cherneff et al. | |
| 7,330,822 | B1 * | 2/2008 | Robson et al. | 705/7.15 |
| 7,406,432 | B1 * | 7/2008 | Motoyama | 705/7.16 |
| 7,519,539 | B1 | 4/2009 | Fliess et al. | |
| 8,050,953 | B2 * | 11/2011 | Motoyama et al. | 705/7.13 |
| 8,290,805 | B2 * | 10/2012 | Usui | 705/7.15 |
| 2002/0194101 | A1 | 12/2002 | Moore et al. | |
| 2006/0123388 | A1 | 6/2006 | Choi et al. | |
| 2006/0136495 | A1 * | 6/2006 | Schaad | 707/104.1 |
| 2006/0271381 | A1 * | 11/2006 | Pui | 705/1 |
| 2007/0067196 | A1 * | 3/2007 | Usui | 705/8 |
| 2008/0255940 | A1 | 10/2008 | Perreault et al. | |
| 2009/0055237 | A1 * | 2/2009 | Henry et al. | 705/8 |
| 2012/0150579 | A1 * | 6/2012 | de Wit | 705/7.14 |

OTHER PUBLICATIONS

Microsoft Exchange, About sharing and delegation, Nov. 27, 2008, p. 1-21, https://iris.nau.edu/homepage/calendar/entourage/sharing.pdf.*
Jameson, Creating a Subtask—JIRA 4.0 Beta, atlassian.com, Oct. 13, 2009, p. 1-6.*
Online Task Management and Project Collaboration Software: Dependency, Zoho software, Dec. 3, 2009, p. 1-5.*
Nested Tasks and Child Tasks, Microsoft.com, May 6, 2010, p. 1-5.*

(Continued)

*Primary Examiner* — Justin M Pats
(74) *Attorney, Agent, or Firm* — Mannava & Kang, P.C.

(57) ABSTRACT

Each of a plurality of team members may define a task by providing data concerning a task to a centralized controller, wherein each task may be assigned any other team member of the plurality of team members. The controller may receive task event information from a first team member of the plurality of team members regarding a task, which task is associated within the controller with the first team member and a second team member. The controller subsequently sends updated task information, based on the task event information, to both the first team member and the second team member. Relevant to any given task, the task event information may comprise a task delegation indication, which may further comprise a non-delegation indication such that further delegation of the task in not permitted.

19 Claims, 6 Drawing Sheets

(56) References Cited

OTHER PUBLICATIONS

"Primavera P6 Project Management", www.oracle.com/us/products/applications/042374.htm?origref=http://www.oracle.com/primavera/index.html as identified on Aug. 12, 2010.
"Easyprojects", http://easyprojects.net as identified on Aug. 12, 2010.
"Genius Project", http://geniusinside.com/solutions/software_features/project_resource_management as identified on Aug. 12, 2010.
"Vertabase", http://www.vertabase.com/ as identified on Aug. 12, 2010.
"Active Collab", http://www.asctivecollabl.com/docs/manuals/user as identified on Aug. 12, 2010.
"Clarizen", http://www.clarizen.com as identified on Aug. 12, 2010.
"Goplan", http://goplanapp.com as identified on Aug. 12, 2010.
"MS Project 2007", http://www.microsoft.com/project/en/us/default.aspx as identified on Aug. 12, 2010.
"MindTools", http://mindtools.com/pages/article/newPPM_01.htm as identified on Aug. 12, 2010.

* cited by examiner

FIG. 7

| SAVE & CLOSE | DELETE | MARK COMPLETE | DELEGATE |
|---|---|---|---|

ACTIONS

TASK INFORMATION

SUBJECT: Complete budget forecast for Project Alpha

START DATE: None ▸ STATUS: Not Started ▸

DUE DATE: None ▸ PRIORITY: Normal ▸

NOTES

704

TASK MANAGEMENT FOR A PLURALITY OF TEAM MEMBERS

FIELD

The instant disclosure relates generally to a task management tools and, in particular, to a task management tool for use by a plurality of team members in which each team member may assign a task to any other team member.

BACKGROUND

In a complex world, the need for tools that permit the effective management of tasks is manifest. As used herein, a task is any work or undertaking assigned by one party to another for completion by the receiving party. Task management is of particular importance where a number of individuals are working toward a common goal (e.g., a project team) and need to depend on the work of each other in order to achieve that goal. In order to effectively manage tasks, either as an assignor or recipient of tasks, it is necessary to maintain self-awareness, transparency, oversight and accountability. Self-awareness refers to understanding of one's context before delegating a task or accepting/denying a delegated task. Transparency concerns communication of expectations regarding execution of a task and/or progress in completing a task, whereas oversight refers to maintaining awareness of assigned tasks and the progress of each task. Finally, accountability refers to measurement of performance of completed tasks, i.e., how well the task was completed in terms of quality, timeliness, etc.

While it is fairly straightforward to define the parameters necessary for successful task management, currently available tools do not meet the need for various reasons. For example, the "MICROSOFT" Project or "BASECAMP" project management tools are useful for project planning but tend to be ineffective when it comes to tracking granular tasks that arise during project execution but that are otherwise not specifically accounted for in a project plan. Additionally, being focused more on the planning phase, these tools typically require a significant initial effort for project setup. Furthermore, any changes to be made to the project plan (including any previously assigned tasks) must be implemented through centralized control, i.e., a project manager, rather than the individuals assigning, and assigned to execute, the tasks.

On the other end of the spectrum, task lists, as known in the art, are easy to use. For example, many email programs provide relatively simple interfaces that allow a user to maintain a personal task list. However, information maintained in such task lists is typically not accessible by anyone other than the individual associated with the task list. Consequently, the parameters noted above for achieving successful task management (e.g, transparency, oversight and accountability) are not supported. As a further consequence, users tend to resort to the use of email to exchange information about tasks such that the resulting "dispersion" of information makes it difficult to properly track and manage the tasks.

SUMMARY

The instant disclosure describes techniques for task management for a plurality of team members. In an embodiment, each of the plurality of team members may define a task by providing data concerning a task to a centralized controller, wherein each task may be assigned any other team member of the plurality of team members. Each of the plurality of team members may communicate with the controller via one or more team member workstations.

The controller may receive task event information from a first team member of the plurality of team members regarding a task, which task is associated within the controller with the first team member and a second team member of the plurality of team members. As used herein, association of a task with a team member refers to that team member being either the person responsible for assigning a task to another, or the person who has been assigned the task by another. Having received the task event information concerning the task, the controller subsequently sends updated task information, based on the task event information, to both the first team member and the second team member. Where the first team member is assigning the task to the second team member, the task event information may comprise a task delegation indication indicating that the second team member is responsible for the task. In this case, the controller may subsequently receive additional task event information from the second team member and thereafter send additional updated task information to both the first and second team members. In this embodiment, the additional task event information may comprise, without limitation, a task acceptance indication, a task refusal indication, a task status indication or a task sub-delegation indication. Alternatively, where the first team member is responsible for the task, the task event information may comprise any of the various task acceptance, a task refusal, a task status or task sub-delegation indications. In those instances where the task event information (or the additional task event information) comprises either a task delegation indication or a task sub-delegation indication, a further non-delegation indication may be included indicating that the task is not further delegable.

Related apparatus and a system for carrying out the aforementioned techniques are also disclosed.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

FIGS. 6-8 are illustrations of various user interfaces in accordance with the instant disclosure.

DETAILED DESCRIPTION OF THE PRESENT EMBODIMENTS

Figure 1:
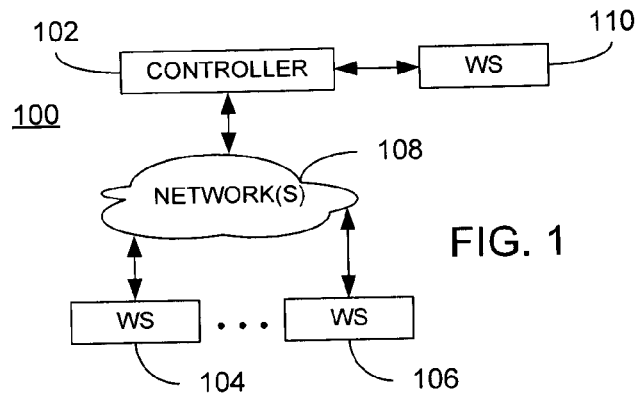
FIG. 1 is a schematic block diagram of a system for management of tasks for a plurality of team members.

Referring now to FIG. 1, a system 100 for use in managing tasks for a plurality of team members is illustrated. Specifically, the system 100 comprises a controller 102 operatively connected with a plurality of team member workstations 104, 106 via one or more networks 108. Alternatively, the controller 102 may communicate directly with other team member workstations 110. In the embodiment illustrated in FIG. 1, the controller 102 serves as a central point for collecting data relating to a plurality of tasks associated with team members that utilize the system 100. As used herein, a team member is an individual capable of submitting data to the controller 102 in accordance with permissions established on the controller 102. For example, using known techniques, the controller 102 may maintain a list of team members according to suitable identifying data (e.g., employee number, user name, etc.) such that only individuals included in the list may submit task-related data to the controller for themselves or other team members on the list. Such lists may be delineated according to any desirable structure, e.g., according to specific projects, offices, regions, etc. As a result, it is understood that individuals may be members of different teams. Any team member of a given plurality of team members may assign a task to any other team member (subject, of course, to the assigned team member's acceptance). This flexibility in assigning tasks permits the system 100 to be more relevant to the fluctuating needs of individual team members and, in this vein, is more capable of tracking relatively granular tasks.

As shown, the controller can communicate with a plurality of team member workstations 104, 106 via one or more networks 108. The network(s) 108 may comprise a wired and/or wireless network as known the art. Furthermore, the network(s) 108 may comprise a wide-area network (WAN) and/or a local area network (LAN), as known in the art. For example, the network(s) 108 may incorporate a global communications network such as the Internet or World Wide Web, wherein individual team member workstations 104, 106 access the global networks via intervening local networks. Wireless networks may be particularly employed where one or more of the team member workstations 104, 106 comprises a mobile device, such as a mobile phone, laptop or handheld computer, etc. Configured in this manner, the system 100 permits users to access the task management services provided by the controller 102 from virtually any location, as described in further detail below. It is understood, however, that the use of an intervening network or networks is not a requirement and that in some implementations, it may be desirable to have one or more team member workstations 110 interact with the controller 102 without the support of an intervening network.

As used herein, it is noted that the terms "team member" and "team member workstation" (or variants thereof) are interchangeable from the viewpoint of the controller 102. That is, any data or information provided to the controller by a team member or sent by the controller to a team member is, in all instances, mediated by a team member workstation 104, 106, 110. Furthermore, the number of team member workstations 104, 106, 110 in the system 100 does not need to be identical to the number of team members depending upon the configuration of the system 100 and the individual needs of each team member.

Figure 2:
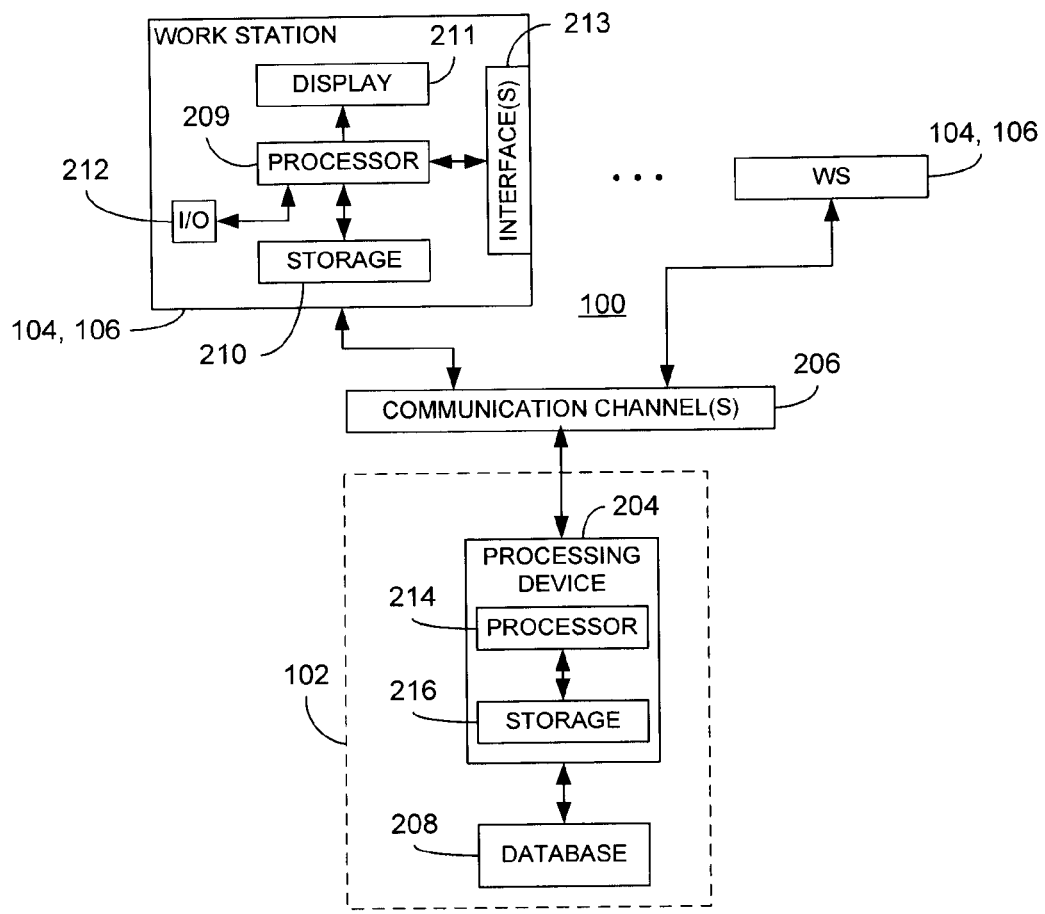
FIG. 2 is a schematic block diagram illustrating the system of FIG. 1 in further detail.

FIG. 2 illustrates a schematic block diagram of the system 100 in greater detail. As described above, the system 100 comprises a plurality of team member workstations 104, 106 in communication with each other and the controller 102 via one or more communication channels 206. In an embodiment, each of the team member workstations 104, 106 comprises a processor-based device such as a desktop/laptop/handheld computer, mobile communication device such as a cellular phone, etc. comprising one or more processors 209 in communication with at least one storage component 210. The processor(s) 209 may comprise microprocessors, microcontrollers, digital signal processors, etc. or combinations thereof operating under the control of executable instructions stored in the storage component(s) 210. The storage component(s) 210 may comprise any combination of volatile/non-volatile memory components such as read-only memory (ROM), random access memory (RAM), electrically erasable programmable read-only memory (EEPROM), etc. The executable instructions stored in the storage component(s) 210 may be particularly used to implement processing as described in greater detail below. However, as known in the art, the team member workstations 104, 106 may be implemented, in whole or in part, using other components such as ASICs, programmable logic arrays, etc. that may operate under software or hardware control.

As further illustrated, each team member workstation 104, 106 preferably comprises a display 211 in communication with the processor(s) 209. As known in the art, the display 211 may comprise an integral or external display such as a cathode-ray tube (CRT), liquid crystal display (LCD), light emitting diode (LED) display, etc. Techniques for providing display data (such as that used to implement the user interface examples of FIGS. 6-8, described below) to a display are well known in the art. In a similar vein, the user terminals 202 preferably include user input/output (I/O) components 212 as well as one or more communication interfaces 213. The I/O components 212 may comprise any mechanism that allows a user of a team member workstation 104, 106 to interact therewith, e.g., a mouse, keyboard, microphone, video and/or still image camera, speaker, etc. The communication interface(s) 213 support the use of the one or more communication channels 206 and typically comprise any combination of hardware and/or software elements necessary to terminate physical links (e.g., Ethernet, wireless, etc.) or communication protocols (e.g., HTTP, SOAP, SSL, TCP/IP, WAP, etc.). Techniques for implementing the interface(s) 213 are well known to those having skill in the art.

As noted above, the communication channels 206 may comprise any one or combination of wired or wireless communication channels, depending on the capabilities of the team member workstations 104, 106 and/or controller 102. Additionally, the communication channels 206 are further defined by the type of communications supported thereby. For example, email communications, voice communications, instant messaging (IM) communications, SMS communications, multimedia messaging service (MMS) communications, etc. may all be supported by different types of communication channels, as known to those of skill in the art. As those having ordinary skill in the art will further appreciate, the various types of network(s) 108 noted above may support the communication channels 206 described herein. A benefit of the techniques described herein is that the task management functions may be provided regardless of the underlying type of communication channels 206 employed.

As shown, the controller 102 preferably comprises a processor-based device 204 comprising at least one processor 214 and at least one storage component 216 similar to those described above with regard to the team member workstations 104, 106. In a presently preferred embodiment, the processing device 204 is implemented using one or more suitably programmed server computers as known in the art. Additionally, the controller 102 may comprise a database 208 that, as known in the art, can also be implemented using one or more suitably programmed database server computers. Generally, the processing device 204 implements the functionality described herein attributed to the controller 102 whereas the database 208 stores the data (i.e., task even information, updated task information, indications provided by team members, etc.) used to implement the task management functions as described herein. Furthermore, although not separately illustrated, the processing device 204 implementing the controller 102 may comprise a suitable email, IM, SMS, etc. server, as known the art, as means for communicating with team members as described in further detail below.

Figure 3:
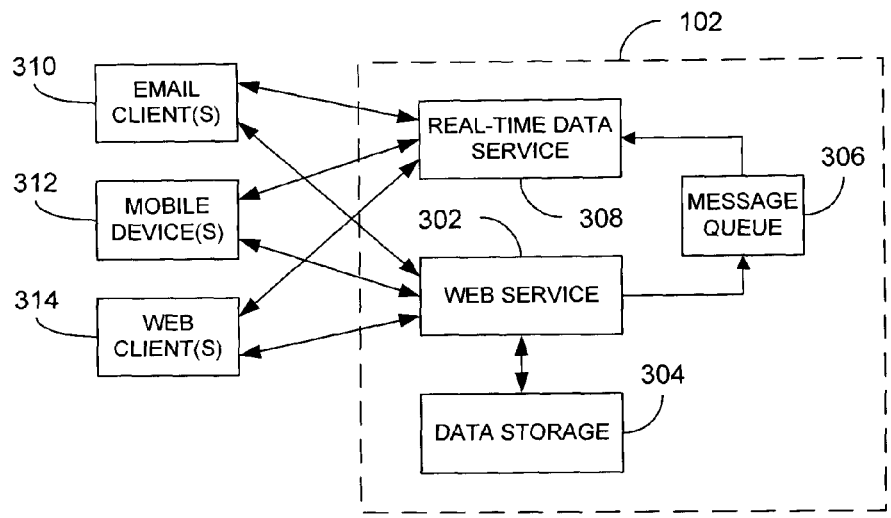
FIG. 3 is a functional block diagram illustrating the controller of FIG. 1 in further detail.

Referring now to FIG. 3, a functional block diagram of the controller 102 is illustrated. In particular, the controller 102 is shown to comprise a web service component 302, a data storage component 304, a message queue component 306 and a real-time data service component 308. In keeping with FIG. 2, the components 302-308 may be implemented by the processing device 204 and/or database 208.

The web service component 302 implements a suitable web service platform that permits access to the task management capabilities described herein. For example, the web service component 302 may be implemented using the well-known "RUBY ON RAILS" web application framework. As known in the art, a web application leverages the flexibility of web browsers and widely available networks such as the Internet and World Wide Web, thereby providing broad access to the functionality of the controller 102. As shown, the web service component 302 is operatively coupled to the data storage component 304. The data storage component 304, which may be implemented using "MONGODB" database management software executing on a suitable server computer platform, maintains data used by the controller 102 in managing tasks submitted by team members. In an embodiment, tasks can be stored in the database as task objects with a variety of attributes, such as due date and priority as well as relationships such as child and parent relative to other tasks. As described in further detail below, the web application implemented by the web service component 302 operates to receive task-related data and provide updates to the data storage component 304 based thereon. Additionally, the web application operates to promulgate such task-related updates to various team members as they become available.

Figure 4:
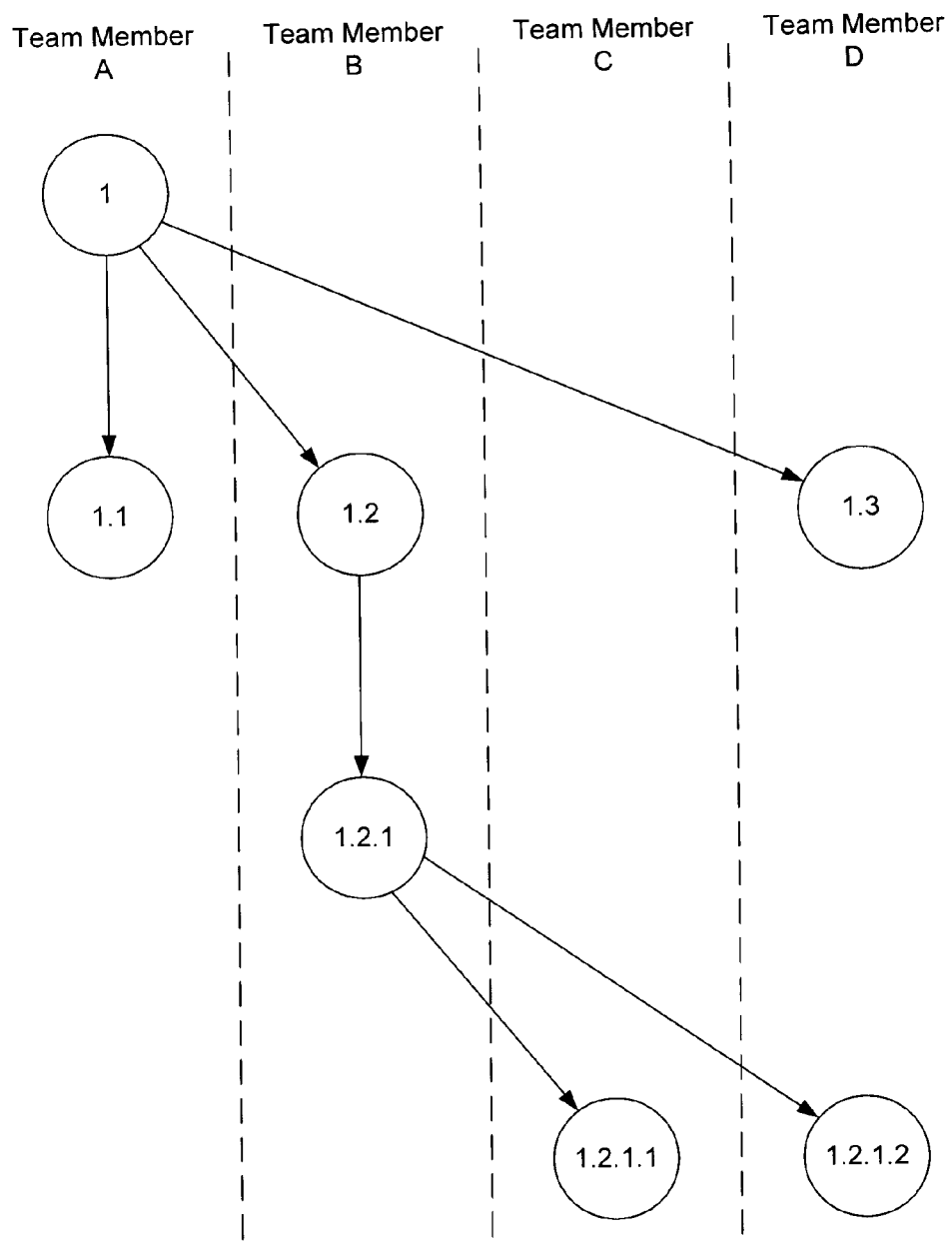
FIG. 4 is a schematic illustration of task objects in accordance with the instant disclosure.

An example of task objects as used herein is illustrated in FIG. 4. As shown therein, each circle illustrates a separate task object that is assigned to corresponding team members illustrated as separate columns. Thus, for example, Tasks 1 and 1.1 are assigned to team member A; tasks 1.2 and 1.2.1 are assigned to team member B, task 1.2.1.1 is assigned to team member C and tasks 1.3 and 1.2.1.2 are assigned to team member D. As noted above, tasks may have parent/child relationships to one another. In the illustrated example, child tasks are labeled according to the parent task's label where, for example, Task 1 has three child tasks labeled 1.1, 1.2 and 1.3. Techniques for indicating such parent/child relationships within a database environment are well known in the art.

As described in greater detail below, the use of task objects supports the ability to delegate task to team members. As used herein, delegation of a task may involve the assignment of at least part, or the entirety, of a task to a team member (including the assigning team member). Thus, when a task is delegated to a team member, the task object being delegated establishes a parent relationship with a newly created child task object representative of that portion of the parent task being delegated and, conversely, the newly created child task object establishes a child relationship with the delegated task object. Such parent/child relationships are stored as attributes of the respective task objects. Likewise, the team member to whom a task is assigned is also reflected as an attribute of each task object. Thus, as shown in FIG. 4, team member A can create Task 1 and subsequently delegate portions of Task 1 to various team members, including him/herself. This is illustrated where team member A has delegated Task 1 three ways:

task 1.1 is delegated to team member A, whereas tasks 1.2 and 1.3 are delegated to team members B and D, respectively. Further delegation (or sub-delegation) is treated in the same manner as illustrated by the further delegation of task 1.2 in which team member B has delegated at least some portion of task 1.2 to him/herself as task 1.2.1, and then further delegated at least portions of task 1.2.1 to team members C and D as tasks 1.2.1.1 and 1.2.1.2, respectively. Note that the external (relative to the task management system) hierarchy of the team members has no bearing on how tasks may be assigned to other team members. For example, in the context of a software development team, team member A may be a junior programmer, whereas team member D may be the project manager who otherwise has management responsibility over team member A.

In addition to the flexibility provided in structuring tasks in this manner, the establishment of new tasks each time a task is delegated permits individual tasks to be broken up as desired such that the resulting tree structure can be traversed according to the various parent/child relationships. As a result, information about each task can be obtained and provided to those who are associated with a given task as well as any related tasks as defined according to the parent/child relationships of the given task. Furthermore, the scope of such available information may be controlled to include task-related information for further branches of the task object tree, e.g., not only information concerning the parent/children of a given task, but also the related parent/children task objects of the given task object's parent/children, and so on. Restrictions on such information access may then be provided as a matter of design choice. Generally, the assigning team member for any given task may see the information for any child tasks, e.g., team member A can see the information for any of the tasks illustrated in FIG. 4 since they all stem from task 1, whereas team member B can see the information for tasks 1.2.1.1 and 1.2.1.2 as the assignor of those tasks. In an embodiment, the ability of a team member that has been assigned a task to see information related to its parent task may be restricted. In this case, for example, team member B may not be allowed to see any information for tasks 1.1 and 1.3 despite the fact that those tasks stem from the same parent task as task 1.2 assigned to team member B. Alternatively, where no such restrictions exist, team member D, as the assigned team member of task 1.2.1.2 could be permitted to see the relevant information for its parent task 1.2.1, as well as task 1.2.1's parent (task 1.2) and other children (task 1.2.1.1). Those having skill in the art will appreciate that these are but two examples of the various restrictions (or lack thereof) that may be applied when permitting sharing of task information.

Referring once again to FIG. 3, the message queue 306, which may comprise the RabbitMQ messaging broker application, permits the sending and receiving of data (in the form of messages) between the data storage component 304 and the real-time data service component 308. In an embodiment, changes to the data concerning the plurality of tasks maintained by the data storage component 304 are queued up by the web service component 302 in the message queue component 306 for subsequent transmission to team members. These changes are queued via requests made from the web service component 302 by the team members at the workstations 104, 106, 110. For example, if a team member changes a task's due date that needs to be pushed out to other team members (by virtue of being associated with that task) the web service will update the information in the data storage component 304 and request a corresponding message in the queue 306. In turn, the real-time data service component 308 operates to push the queued updates to the team members. For example, the real-time data service component 308 may be implemented using the Tornado web server application implemented by one or more suitable server computers. As those having ordinary skill in the art will appreciate, the real-time data service component 308 permits a large number of users (e.g., team members) to be simultaneously provided with data as it becomes available.

As further shown in FIG. 3, both the web service component 302 and the real-time data service component 308 communicate with a variety of clients 310-314 used by team members. In the illustrated examples, one or more email clients 310, mobile devices 312 and/or web clients 314 may communicate (typically via one or more intervening networks) with the controller 102. With reference to FIG. 2, each of the clients 310-314 may be implemented by one or more of the team member workstations 104, 106, 110, typically in the form of instructions stored in the storage component 210 and executed by the processor(s) 209. In operation, a team member may use any of the clients 310-314 to communicate task-related data to and receive data from the web service component 302 and/or the real-time data service component 308. For example, as described in greater detail below, a given team member may receive form data for a user interface from the web service component 302 and, in return, provide task-related data to the web service component 302. Similarly, each of the clients 310-314 may submit persistent queries for data to the real-time data service component 308 that in return provides the requested data, when available, back to the clients 310-314.

Figure 5:
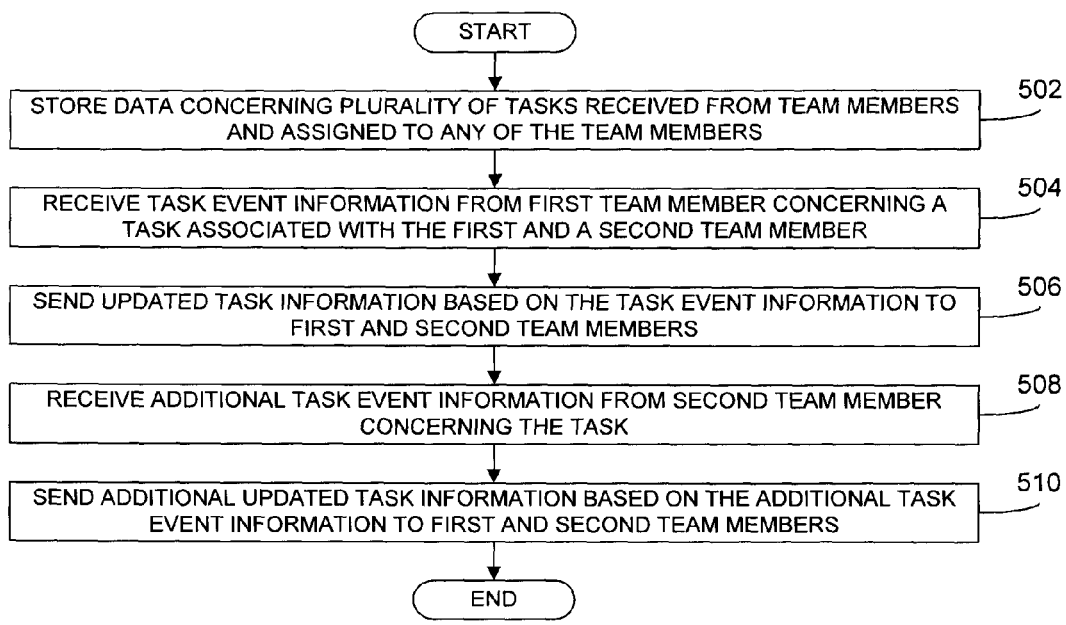
FIG. 5 is a flow chart illustrating processing in accordance with the instant disclosure.

Referring now to FIG. 5, a flowchart illustrating processing in accordance with the instant disclosure is provided. In an embodiment, the processing described with reference to FIG. 5 is carried out by the controller 102. However, as described below, the processing illustrated in FIG. 5 necessarily implicates, in some instances, complementary processing by one or more of the team member workstations 104, 106, 110. Beginning at block 502, the controller stores data concerning a plurality of tasks received from ones of a plurality of team members and assigned to any of the plurality of team members. One technique for each team member to submit such task-related data to the controller is further illustrated with regard to FIG. 7.

Referring now to FIG. 7, a representative user interface 700 for use in submitting task-related data to a controller is illustrated. In an embodiment, the user interface 700 (as well as the other user interfaces 600, 800 illustrated in FIGS. 6 and 8) is provided to a team member workstation 104,106, 110 by the web service component 302 of the controller 102 in the form of display data and displayed on a display 211 of the team member workstation 104, 106,110. Once again, techniques for providing display data in this manner are well known in the art. In the illustrated embodiment, the user interface 700 comprises a number of data entry fields 702, 704 for the provision, by a team member using the workstation's I/O facilities 212, of task-related data when creating a new task. For example, a subject data entry field in the form a text input box is provided to permit the team member to enter text values descriptive of the task being created, e.g., "Complete budget forecast for Project Alpha" in the illustrated example. Likewise, input fields in the form of drop down menus are provide that permit the team member to define both a date on which the task is to be started and an expected due date for completion of the task. Further still, other input fields also in the form of drop down menus are provided that permit the user to designate a status of the task (which, during task creation, defaults to "Not Started" as shown) and a priority of the task (which also defaults to a "Normal" value during task creation). Finally, in the illustrated embodiment, a notes field 704 is provided in the form of another text input box whereby the team member can provide free form text concerning the task, e.g., specifics about how the task is to be completed, who (other than the team member defining the task) is requesting that the task be completed, identification of particular resources that may be required to complete the task, etc.

All of the data entered via the illustrated data entry fields 702, 704 is provided to the controller 102, in accordance with well know techniques, when the team member selects the save and close button 706. In response to receiving such data, the controller 102 stores the received data as noted above. Conversely, if the team member desires to discard whatever data has been entered to that point, he/she can select the delete button 708. In those instances where it may be desirable, for example, to update a previously defined task, it may be further desirable to also provide a cancel button (not shown) whereby any changes made to the previously defined task can be discarded without having to delete the entire task. Two additional buttons may be provided as shown. Particularly, a mark complete button 210 is provided such that selection thereof by a team member will cause an indication that the task has been completed to be sent to the controller 102. In this sense, the mark complete button 210 is a specific instance of the status data entry field noted above. As further shown, a delegate button 712 may be provided whereby the team member can cause the task to be delegated to another team member. As noted above, delegation of a task results in creation of a new, child task object assigned to the assigned team member, whereas the assigning team member remains responsible for the parent task. In this manner, the assigning team member retains responsibility of the overall task and is able to monitor (by virtue of the resulting parent/child relationship between the task objects) progress of the delegated task.

In addition to task creation, the user interface 700 may also be employed for modifying a previously established task as noted above. To this end, when a given existing task is selected (using, for example a task manager user interface 600 as discussed below relative to FIG. 6), the data entry fields 702, 704 of the user interface remain editable such that any such changes made can be provided to the controller 102 via subsequent selection of the save and close button 706. Similarly, selection of the mark complete button 710 or the delegate button 712 will result in updated data being provided to the controller 102.

Figure 6:
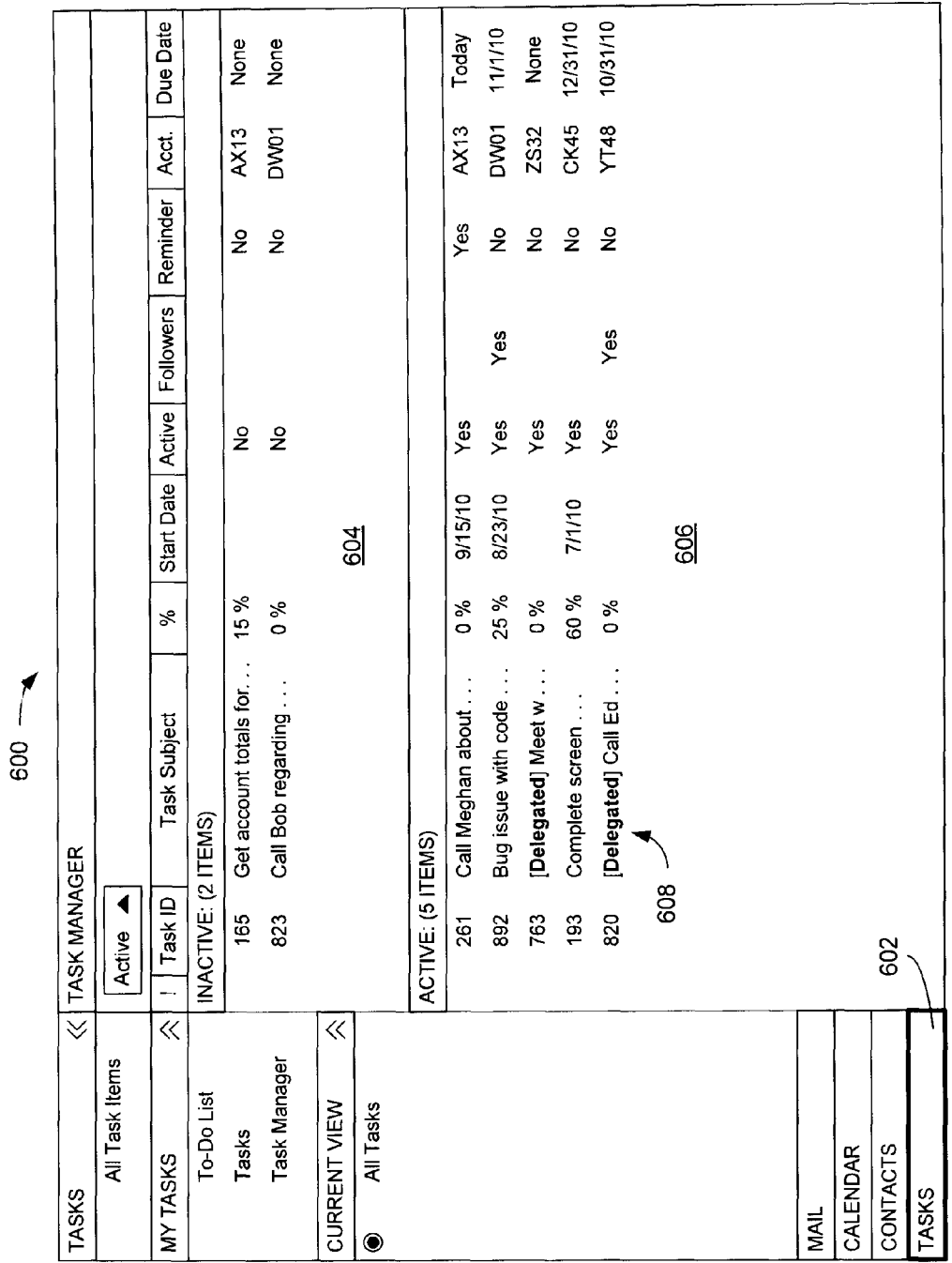

Referring once again to FIG. 5, with the data concerning a plurality of tasks stored in the controller, as indicated by block 502, each team member may receive any relevant information concerning tasks with which they are associated. An example of this is illustrated in FIG. 6, where a representative task manager user interface 600 is illustrated. As shown, the task manager user interface 600, which may be implemented as part of an email or calendar application, may be invoked by selection of a tasks button 602. When activated, the task manager user interface 600 comprises a task viewing area having an inactive task area 604 and an active task area 606. In the example illustrated in FIG. 6, the inactive task area 604 shows two inactive tasks, whereas the active task 606 area shows five active tasks. Active tasks are those tasks which have no dependent, non-complete child tasks. That is, active tasks either have no dependent child tasks, or the child tasks are marked complete. Conversely, inactive tasks are those which have dependent child tasks that are non-complete. In this sense, an inactive task is one whose completion is dependent upon another team member, whereas an active task, while not necessarily completed, is not dependent upon any one else. As indicated above relative to FIG. 4, such child tasks may be assigned to other users as well as the responsible member of the parent task. Regardless of whether it's active or inactive, each task may comprise a unique identifier (assigned by the controller upon task creation) and a task subject describing the task. Relevant dates for each task, including a start date and a due date may be provided. Additionally, each task listing may include various status-related information such as whether the task is active (i.e., whether completion of the task is currently expected), whether the task has high priority (as indicated by the reminder indication), and a completion percentage field which indicates how much of the task has been completed as reported by the assigned team member and stored on the controller. Other data relevant to a task may also be displayed. For example, in the context of a business or other commercial enterprise, it may be desirable to track tasks not only by the controller-provided task identification, but also by a financial accounting number. Further still, in furtherance of the information provision/restrictions described above, a followers field may be provided whereby a binary indication is provided whether those team members not directly associated with a task, i.e., the assigning or assigned team members, are able to see information for that task. Once again, all of the data provided in both the inactive task area 604 and the active task area 606 is maintained by the controller 102 and provided thereby to each team member workstation 104, 106, 110.

Each of the tasks illustrated in FIG. 6 may be selected for further editing as noted above. For example, a previously defined task can be selected and subsequently delegated to another team member. In those instances, the task manager user interface 600 may include indicia 608 indicating that the task has been delegated. Equally important, as updates by the assigned team member concerning the task are received by the controller, they are provided not only to the assigned team member but also the assigning team member (and, as permitted, any other team members).

Referring once again to FIG. 5, processing continues at block 504 where the controller receives task event information from a first team member of the plurality of team members concerning a task associated with the first team member and a second team member of the plurality of team members. In an embodiment, when task event information is provided to the controller, the message used to convey the task event information comprises an identification of the relevant task (such as the task identification noted above relative to FIG. 6) such that the controller can identify the relevant stored data concerning the task As noted above, association of the task with the first and second team members means that either the first team member assigned the task to the second team member or vice versa. Regardless of each team member's status as being the assigning/assigned team member, their association with the task means that they will receive any information available in the controller concerning that task.

As used herein, task event information comprises any data or information concerning a given task that would require an update of that task's data stored in the controller. For example, where the first team member has been assigned the task by the second team member, the task event information may comprise a task acceptance indication whereby the first team member manifests his/her intention to accept the task assigned by the second team member. Alternatively, the task event information may comprise a task refusal indication whereby the first team member manifests his/her intention to refuse the task assigned by the second team member. In the case where the task has already been assigned to and accepted by the first team member, the task event information may comprise a task status indication that includes data or information indicating the current status of the task. For example, the task status information may be confined to relatively simple status indications such as "in process" or "completed." Alternatively, more fine-grained status indications may be employed. For example, the task status information may be a self-reported completion percentage as estimated by the person responsible for the task. Alternatively, the task status information could comprise a more descriptive textual indication, e.g., "not started", "in process", "in process, awaiting other input", "completed, awaiting review", "completed", "deferred", etc.

In keeping with the above-noted embodiments regarding delegation, the task event information may comprise a task delegation indication. The task delegation indication, in the case where the first team member has previously been assigned the task (either by virtue of creating the task or having been previously delegated the task by another team member), indicates that the first team member has delegated the task to another team member. In an embodiment, as delegations of tasks are made, updates concerning such delegations are provided to the relevant parties as soon as they are received by the controller. For example, the updated information may be reflected in the task manager user interface 600 of each relevant party. For example, assume team member A creates a task and then delegates some of it to team member B, who in turn delegates some of it to team member C. When, for example, C accepts the delegation from B, the controller is so informed and subsequently updates the interfaces used by A and B. In yet another embodiment, the task sub-delegation indication comprise a non-delegation indication indicating that the task is not further delegable. For example, where the first team member is delegating a task to another team member, the non-delegation indication informs the controller and the other team member that the task cannot be delegated yet again by the other team member. Alternatively, if the non-delegation indication is not provided, then the recipient of the delegation would be permitted to delegate yet again and the controller would not prevent such further delegation.

At least some of the examples of event information noted above assume the situation where the first team member has been assigned the task by the second team member. However, as also noted previously, the reverse may also be true where the first team member is attempting to assign the task to the second team member. In this case, the task event information may comprise a task delegation indication that specifies the second team member as the party to which the task is being assigned. Note that the process of delegation is the same (in the sense that a new task is created and assigned) regardless how many times previous delegations have occurred. Likewise, each instance of task delegation may be accompanied by a non-delegation indication thereby preventing the assigned party from further delegating the task.

Figure 8:
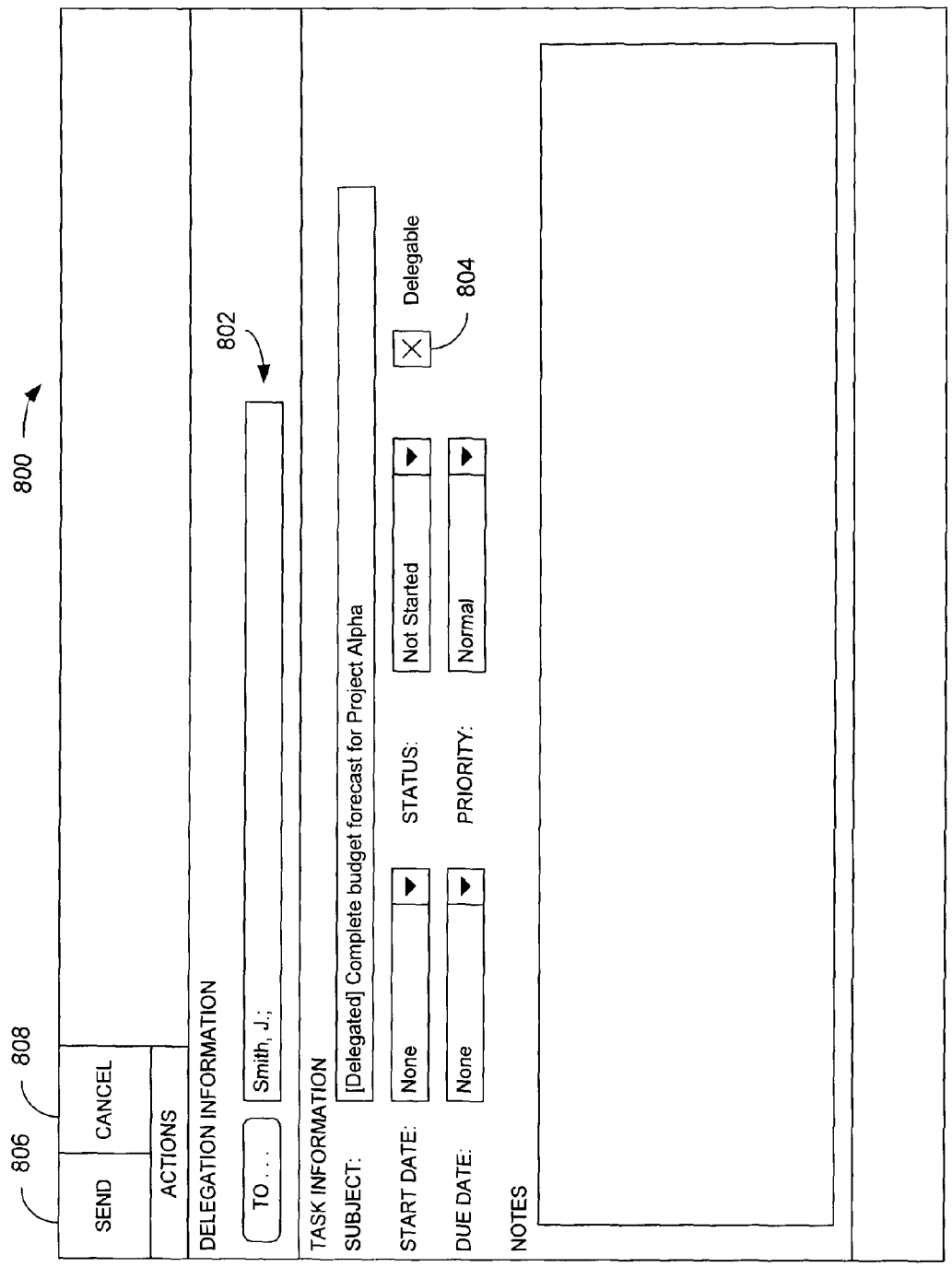

A representative delegation user interface 800 used to facilitate the delegation of tasks is illustrated in FIG. 8. As noted with regard to FIGS. 6 and 7, it is possible to select a task currently assigned to a team member and select the delegate button 712. As shown in FIG. 8, the resulting delegation interface 800 comprises the same information provided in the task creation/edit interface 700, but also includes a data entry field 802 that is used to designate the team member to whom the task is to be delegated. For example, where the delegation interface 800 is part of an email program or the like, a button may be provided (shown as the "To . . . " button in FIG. 8) may be provided that allows the delegating team member to browse contact or email address information to select the desired team member. Those having ordinary skill in the art will appreciate that other data input mechanisms (e.g., text entry boxes, pre-populated pull down menus, etc.) may be equally employed for this purpose. Additionally, FIG. 8 illustrates an embodiment of an input mechanism 804 that may be used provide the above-described non-delegation indication. In the illustrated embodiment, selection of the input mechanism 804 (in the illustrated example, a check box) will prevent a non-delegation indication from being provided to the controller, i.e., the task will be further delegable. However, if the input mechanism 804 is not selected, a non-delegation indication will be provided to the controller, thereby preventing further delegation of the request. Once again, other configurations of various input mechanisms will be apparent to those having ordinary skill in the art. As before, a send button 806 may be provided such that the team member's selection in delegating the task are saved and sent to the controller, or a cancel button 808 such that delegation-related inputs are discarded without being provided to the controller.

In an embodiment, when a task is delegated to another team member, the team member to whom the task has been assigned may be provided with an email or similar message indicating that the team member has been delegated a task by the assigning team member. In this embodiment, the email (or other type) message may include links that allow the receiving team member to indicate his/her willingness to accept or refuse the task. Upon selection of either link, the controller is updated with this task event information as described above.

Referring once again to FIG. 5, in response to the task event information received by the controller at block 504, the controller determines updated task information (based on the task event information) and sends the updated task information to the first and second team members (and other relevant team members, if any) at block 506. Updated task information includes any data maintained by the controller that is modified in any way due to the task event information received at block 504. For example, where the second team member has assigned the task to the first team member and the task event information comprises a task acceptance indication, the updated task information may include any necessary modifications to the stored data for that task indicating this change in responsibilities. As a result, in this example, the updated task information may include the indicia 608 in the user interface provided to the second team member indicating that the task has now been delegated. Note that the indicia 608 reflecting the status of a task as delegated would also be included in any relevant user interface provided to the assigned team member, e.g., the first team member in this example, thereby indicating to the assigned team member that the task was delegated to him/her by another team member. By propagating updated task information in this manner, all relevant parties are provided with information that allows them to individually monitor and manage the task and thereby best ensure the successful completion of the task.

Thereafter, at block 508, the controller may receive additional task event information from the second team member concerning the task and, at block 510, additional updated task information is provided by the controller to at least the first and second team members. For example, where the event data from block 504 include a task delegation indication from the first team member to the second team member, the additional task event information could comprise a task acceptance indication from the second team member and/or another task delegation indication from the second team member. Regardless, the receipt of the additional task event information results in the additional updated task information being sent to all relevant team member in the same manner as described above. As a result, any given team member associated with a task is permitted to cause updated task information to be generated and sent to all other team members associated with the task. In turn, this ability to equally contribute to task-related data maintained by the controller permits greater flexibility for team members to actively manage tasks.

While example embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for task management for a plurality of team members, the method comprising:
storing, by a processor-implemented controller, data concerning a plurality of tasks received from ones of the plurality of team members and assigned to any of the plurality of team members;
receiving, by the controller, task event information from a first team member of the plurality of team members concerning a task of the plurality of tasks associated in the controller with the first team member and a second team member of the plurality of team members, wherein the task event information comprises a task delegation indication indicating that the second team member is at least partially responsible for completing the task, and wherein the task delegation indication establishes one of a parent and child relationship for at least one task object of the task;
generating a tree structure that includes parent and child relationships between task objects of the tasks, wherein the task includes the at least one task object and at least one attribute related to the at least one task object, wherein the at least one task object includes at least one task portion of the task being delegated, and wherein the at least one attribute indicates one of a parent and child relationship of the at least one task object relative to at least one of the tasks;
sending, by the controller, updated task information to the first team member and the second team member based on the task event information, wherein the updated task information comprises the tree structure that includes the parent and child relationships between the task objects of the tasks, and updated task information for active and inactive tasks, and wherein the plurality of team members comprises greater than two team members, and wherein any team member of the plurality of team members can cause the updated task information to be generated and sent to all team members of the plurality of team members associated with the task;
evaluating the tasks to determine the active tasks as tasks that do not include dependent child tasks or do not include non-complete child tasks, and are complete or incomplete;
evaluating the tasks to determine the inactive tasks as tasks that include child tasks that are non-complete; and
assigning a followers field to at least one of the plurality of tasks that includes an indication of whether a team member not directly associated with the task has authorization to view the updated task information.

2. The method of claim 1, wherein the task delegation indication comprises a non-delegation indication indicating that the task is not further delegable.

3. The method of claim 1, further comprising:
receiving, by the controller, additional task event information from the second team member concerning the task; and sending, by the controller, additional updated task information to the first team member and the second team member based on the additional task event information.

4. The method of claim 3, wherein the additional task event information comprises any one of a task acceptance indication, a task refusal indication, a task status indication or another task delegation indication indicating that a third team member of the plurality of team members is at least partially responsible for completing the task.

5. The method of claim 3, wherein the additional task event information comprises another task delegation indication indicating that a third team member of the plurality of team members is at least partially responsible for completing the task, and wherein the other task delegation indication comprises a non-delegation indication indicating that the task is not further delegable.

6. The method of claim 1, wherein the first team member is responsible for completing the task and wherein the task event information comprises any one of a task acceptance indication, a task refusal indication, a task status indication or another task delegation indication indicating that a third team member of the plurality of team members is at least partially responsible for completing the task.

7. The method of claim 1, wherein the task event information comprises another task delegation indication indicating that a third team member of the plurality of team members is at least partially responsible for completing the task, and wherein the other task delegation indication comprises a non-delegation indication indicating that the task is not further delegable.

8. The method of claim 1, wherein the any team member of the plurality of team members can delegate the task to any other team member of the plurality of team members.

9. The method of claim 1, further comprising:
assigning a unique identifier to each of the plurality of tasks;
assigning a financial accounting number to each of the plurality of tasks.

10. The method of claim 1, wherein the indication in the followers field includes a binary indication of whether the team member not directly associated with the task has authorization to view the updated task information.

11. The method of claim 1, wherein an external hierarchy of the plurality of team members is independent of an authority of the any team member of the plurality of team members to delegate the task to any other team member of the plurality of team members.

12. An apparatus for task management for a plurality of team members, comprising:
a processor; and
a storage device operatively connected to the processor and having stored thereon executable instructions that, when executed by the processor, cause the processor to:
store data concerning a plurality of tasks received from ones of the plurality of team members and assigned to any other ones of the plurality of team members;
receive task event information from a first team member of the plurality of team members concerning a task of the plurality of tasks associated in the controller with the first team member and a second team member of the plurality of team members, wherein the task event information comprises a task delegation indication indicating that the second team member is at least partially responsible for completing the task, and wherein the task delegation indication establishes one of a parent and child relationship for at least one task object of the task;
generate a tree structure that includes parent and child relationships between task objects of the tasks, wherein the task includes the at least one task object and at least one attribute related to the at least one task object, wherein the at least one task object includes at least one task portion of the task being delegated, and wherein the at least one attribute indicates one of a parent and child relationship of the at least one task object relative to at least one of the tasks;
send updated task information to the first team member and the second team member based on the task event information, wherein the updated task information comprises the tree structure that includes the parent and child relationships between the task objects of the tasks, and updated task information for active and inactive tasks, and wherein the plurality of team members comprises greater than two team members, and wherein any team member of the plurality of team members can cause the updated task information to be generated and sent to all team members of the plurality of team members associated with the task;
evaluate the tasks to determine the active tasks as tasks that do not include dependent child tasks or do not include non-complete child tasks, and are complete or incomplete;
evaluate the tasks to determine the inactive tasks as tasks that include child tasks that are non-complete; and
assign a followers field to at least one of the plurality of tasks that includes an indication of whether a team member not directly associated with the task has authorization to view the updated task information.

13. The apparatus of claim 12, wherein the executable instructions that, when executed by the processor, cause the processor to receive the task delegation indication are further operative, when executed by the processor, to receive, from the first team member, a non-delegation indication indicating that the task is not further delegable.

14. The apparatus of claim 12, wherein the storage device further comprise executable instructions that, when executed by the processor, cause the processor to:
receive additional task event information from the second team member concerning the task; and
send additional updated task information to the first team member and the second team member based on the additional task event information.

15. The apparatus of claim 14, wherein the executable instructions that, when executed by the processor, cause the processor to receive the additional task event information are further operative, when executed by the processor, to receive, from the second team member, any one of a task acceptance indication, a task refusal indication, a task status indication or another task delegation indication indicating that a third team member of the plurality of team members is responsible for completing the task.

16. The apparatus of claim 14, wherein the executable instructions that, when executed by the processor, cause the processor to receive the additional task event information are further operative, when executed by the processor, to receive, from the second team member, another task delegation indication indicating that a third team member of the plurality of team members is responsible for completing the task, and a non-delegation indication indicating that the task is not further delegable.

17. The apparatus of claim 12, wherein the first team member is responsible for completing the task and wherein the executable instructions that, when executed by the processor, cause the processor to receive the task event information are further operative, when executed by the processor, to receive, from the first team member, any one of a task acceptance indication, a task refusal indication, a task status indication or a task delegation indication indicating that a third team member of the plurality of team members is responsible for completing the task.

18. The apparatus of claim 12, wherein the executable instructions that, when executed by the processor, cause the processor to receive the task event information are further operative, when executed by the processor, to receive, from the first team member, a task delegation indication indicating that a third team member of the plurality of team members is responsible for completing the task, and a non-delegation indication indicating that the task is not further delegable.

19. A system for task management for a plurality of team members, the system comprising:
- a plurality of team member workstations; and
- a controller, operatively connected to the plurality of workstations and configured to:
  - receive, from ones of the plurality of team member workstations, data concerning a plurality of tasks assigned to any of the plurality of team members;
  - receive task event information from a first team member workstation of the plurality of team member workstations concerning a task of the plurality of tasks associated with the first team member and a second team member of the plurality of team members, wherein the task event information comprises a task delegation indication indicating that the second team member is at least partially responsible for completing the task, and wherein the task delegation indication establishes one of a parent and child relationship for at least one task object of the task;
  - generate a tree structure that includes parent and child relationships between task objects of the tasks, wherein the task includes the at least one task object and at least one attribute related to the at least one task object, wherein the at least one task object includes at least one task portion of the task being delegated, and wherein the at least one attribute indicates one of a parent and child relationship of the at least one task object relative to at least one of the tasks;
  - send updated task information to the first team member and the second team member based on the task event information, wherein the updated task information comprises the tree structure that includes the parent and child relationships between the task objects of the tasks, and updated task information for active and inactive tasks, and wherein the plurality of team members comprises greater than two team members, and wherein any team member of the plurality of team members can cause the updated task information to be generated and sent to all team members of the plurality of team members associated with the task;
  - evaluate the tasks to determine the active tasks as tasks that do not include dependent child tasks or do not include non-complete child tasks, and are complete or incomplete;
  - evaluate the tasks to determine the inactive tasks as tasks that include child tasks that are non-complete; and
  - assign a followers field to at least one of the plurality of tasks that includes an indication of whether a team member not directly associated with the task has authorization to view the updated task information.

\* \* \* \* \*